US008554000B2

(12) United States Patent
Cho et al.

(10) Patent No.: US 8,554,000 B2
(45) Date of Patent: Oct. 8, 2013

(54) IMAGE FORMING APPARATUS AND METHOD

(75) Inventors: Jeong-hwan Cho, Suwon-si (KR); Ki-min Kang, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1239 days.

(21) Appl. No.: 12/013,608

(22) Filed: Jan. 14, 2008

(65) Prior Publication Data

US 2008/0317360 A1 Dec. 25, 2008

(30) Foreign Application Priority Data

Jun. 25, 2007 (KR) .................... 10-2007-0062202

(51) Int. Cl.
*G06K 9/36* (2006.01)

(52) U.S. Cl.
USPC ....................................... 382/233

(58) Field of Classification Search
USPC ......... 382/162, 164–167, 171, 173, 176, 232, 382/233, 274, 275, 284; 348/461, 468; 358/3.03, 462, 500
See application file for complete search history.

(56) References Cited

U.S. PATENT DOCUMENTS

| 5,737,454 A * | 4/1998 | Park et al. ..................... 382/284 |
| 2004/0212838 A1 * | 10/2004 | Yamamoto et al. ............ 358/2.1 |
| 2005/0041146 A1 * | 2/2005 | Lee et al. ....................... 348/468 |

FOREIGN PATENT DOCUMENTS

| KR | 10-2004-0089513 A | 10/2004 |
| KR | 10-2007-0041926 A | 4/2007 |

OTHER PUBLICATIONS

Korean Office Action for Application No. 10-2008-0002740 dated Jul. 23, 2012.

* cited by examiner

*Primary Examiner* — Duy M Dang

(74) *Attorney, Agent, or Firm* — Stanzione & Kim, LLP

(57) ABSTRACT

An image forming apparatus and an image forming method thereof are provided. An image forming apparatus according to an exemplary embodiment of the present general inventive concept comprises a decoder to decode a compressed image to convert the compressed image into image data, a pure black determining unit to determine whether the image data is pure black by using information of the converted image data, a section classifying unit to classify the image data into a text section and an image section by using a result of the pure black determination, and a color coordinate converter to perform color coordinate conversion on the image section of the classified sections. Therefore, it is possible to improve readability of black text.

24 Claims, 6 Drawing Sheets

IMAGE FORMING APPARATUS AND METHOD

CROSS-REFERENCE TO RELATED APPLICATIONS

This application claims priority under 35 U.S.C. §119 from Korean Patent Application No. 2007-62202, filed on Jun. 25, 2007, in the Korean Intellectual Property Office, the disclosure of which is hereby incorporated by reference in its entirety.

BACKGROUND OF THE INVENTION

1. Field of the Invention

The present general inventive concept relates to image forming apparatus and method, and more particularly, to image forming apparatus and method capable of improving readability of a text in a pure black display mode.

2. Description of the Related Art

Generally, an image forming apparatus such as a printer receives compressed images from a host apparatus, restores the compressed images, and prints the restored images. In this case, text and images occur in data restored by a decoder of an image forming apparatus.

Since data restored by the decoder of the image forming apparatus may be not in a color space used for the image forming apparatus, it may be required to have a process of converting the data restored by the decoder into data in the color space used for the image forming apparatus.

In the color space converting process, black-and-white text of the restored data in which text and images occur should be converted into pure black text in order to improve readability of the text on a finally printed image.

Various methods of displaying a black-and-white text in pure black in the color coordinate converting process have been proposed to improve readability of the black-and-white text, including a method of emphasizing only black data of text data. However, in this method, only black data are emphasized, which results in discontinuity in gray scale.

In order to complete the method of emphasizing only black data, a method of converting black-and-white text into composite black text has been proposed.

However, according to this method, black-and-white text may be displayed in colors, such as cyan, magenta, and yellow, other than black, which causes readability of text in a finally printed image to be reduced.

SUMMARY OF THE INVENTION

The present general inventive concept provides image forming apparatus and method capable of classifying each of a plurality of blocks constituting an image into an image section or a text section and separately performing a color coordinate conversion on each of the plurality of blocks according to whether the corresponding block is classified into an image section or a text section, thereby improving readability of text.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus comprising a decoder to decode a compressed image to convert the compressed image into image data, a pure black determining unit to determine whether the image data is pure black by using information of the converted image data, a section classifying unit to classify the image data into a text section and an image section by using a result of the pure black determination, and a color coordinate converter to perform color coordinate conversion on the image section of the classified sections.

The information of the image data may be color difference signal information of the image data.

The pure black determining unit may perform pure black determination in decoded block units.

When the information of the image data is within a pure black error range, the pure black determining unit may determine that the decoded block is pure black.

The pure black determining unit may perform pure black determination by using the information of the image data corresponding to the first pixel of the decoded block.

When a predetermined number or more of successive decoded blocks are determined to be pure black by the pure black determining unit, the section classifying unit may classify the predetermined number or more of successive decoded blocks into the text section.

The color coordinate converter may perform the color coordinate conversion on the image section of the classified sections but may not perform the color coordinate conversion on the text section.

The color coordinate converter may reflect brightness information to each of the decoded blocks classified into the text section.

The image forming apparatus may further comprise a binary image generator to convert the image data into a binary image by performing the color coordinate conversion on only the image section, and a printing unit to print the converted binary image.

The foregoing and/or other aspects and utilities of the present general inventive concept may also be achieved by providing an image forming method comprising decoding a compressed image to convert the compressed image into image data, determining whether the image data is pure black by using information of the converted image data, classifying the image data into a text section and an image section by using a result of the pure black determination, and performing color coordinate conversion on the image section of the classified sections.

In this method, the information of the image data may be color difference signal information of the image data.

The determining of whether the image data is pure black may be performed by pure black determination in decoded block units.

When the information of the image data is within a pure black error range, the determining of whether the image data is pure black may determine that the decoded block is pure black.

The determining of whether the image data is pure black may perform the pure black determination by using the information of the image data corresponding to the first pixel of the decoded block.

When a predetermined number or more of successive decoded blocks are determined to be pure black, the classifying of the image data into a text section and an image section may classify the predetermined number or more of successive decoded blocks into the text section.

The performing of color coordinate conversion may perform the color coordinate conversion on the image section of the classified sections but does not perform the color coordinate conversion on the text section.

The performing of color coordinate conversion may reflect brightness information to each of decoded blocks classified into the text section.

The image forming method may further comprise converting the image data into a binary image by performing the color coordinate conversion on only the image section, and printing the converted binary image.

The foregoing and/or other aspects and utilities of the present general inventive concept may also be achieved by providing an image forming apparatus comprising a decoder to output image data of a compressed image, a pure black determining unit to map the image data into a text section and an image section, and a color coordinate converter to prevent color coordinate conversion on the text section to output pure black data of the text section.

The pure black determining unit may set bit information corresponding to the text section and the image section to generate a pure black determination map.

The pure black determining unit may set the bit information corresponding to the text section to a first value, and may set the bit information corresponding to the image section to a second value.

The color coordinate converter may perform the color coordinate conversion on the image section to output color mix data of the image section.

The image forming apparatus may further comprise a printing unit to print an image on a printing medium according to the pure black data of the text section and the color mix data of the image section.

The image forming apparatus may also comprise a printing unit to print an image on a printing medium according to the pure black data of the text section.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
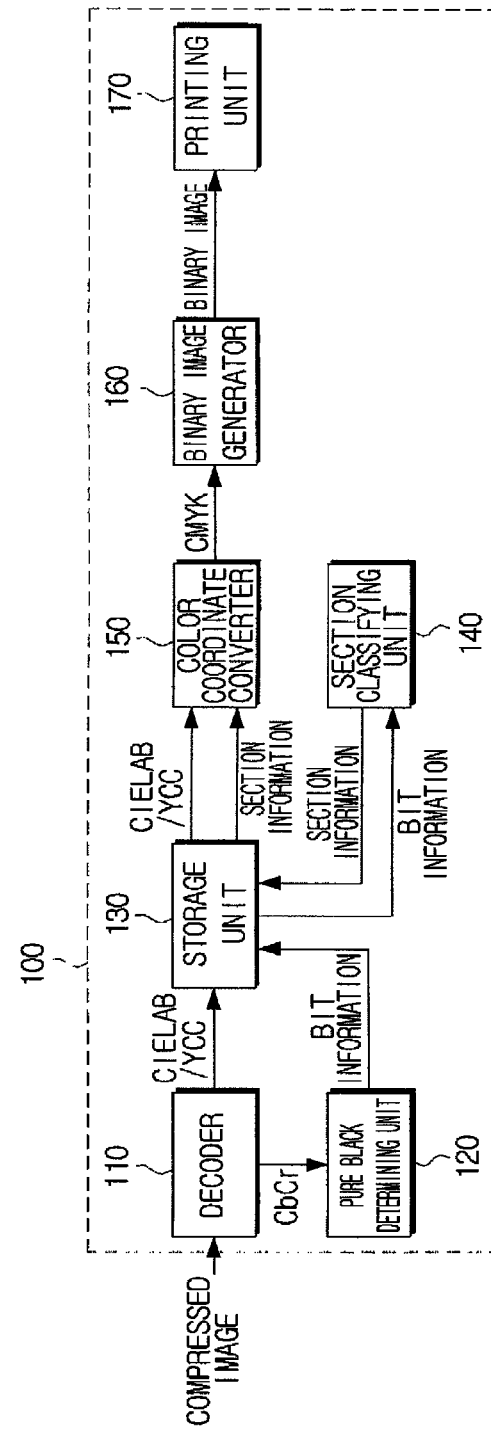
FIG. 1 is a block diagram of an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The matters defined in the following description, such as detailed construction and elements, are provided to assist in a comprehensive understanding of the present general inventive concept. Thus, it is apparent that the present general inventive concept can be carried out without those specifically defined matters. Also, well-known functions or constructions are not described in detail since they would obscure the general inventive concept with unnecessary detail.

Figure 2:
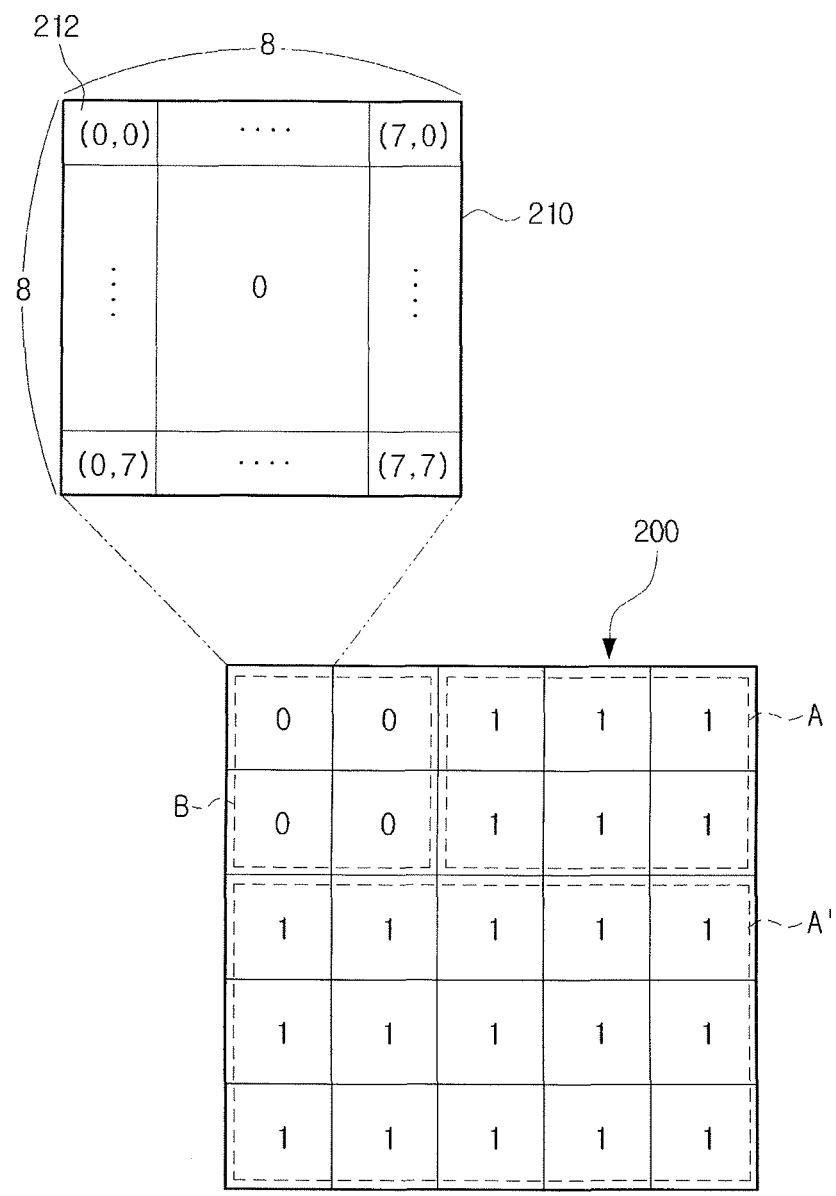
FIG. 2 is a diagram of an example of a pure black determining map output from a pure black determining unit illustrated in FIG. 1.

FIG. 1 is a block diagram of an image forming apparatus according to an exemplary embodiment of the present general inventive concept, and FIG. 2 is a diagram illustrating an example of a pure black determining map output from a pure black determining unit illustrated in FIG. 1.

Referring to FIG. 1, an image forming apparatus 100 according to an exemplary embodiment of the present general inventive concept may comprise a decoder 110, a pure black determining unit 120, a storage unit 130, a section classifying unit 140, a color coordinate converter 150, a binary image generator 160, and a printing unit 170.

The decoder 110 may decode a compressed image input to the image forming apparatus 100 into image data. The compressed image may be an image signal input from a storage medium such as a host apparatus (not illustrated) or a flash memory to the image forming apparatus 100. Alternatively, the compressed image may be a JPEG (Joint Photographic Experts Group) image.

The decoder 110 may perform a decoding process which is reverse to a process of compressing an image through sampling, DCT (Discrete Cosine Transform), quantization, and Huffman coding. In other words, the decoder 110 may restore the compressed image through Huffman decoding, de-quantization, IDCT (Inverse Discrete Cosine Transform), and up-sampling.

Following is a brief description of a decoding process in accordance with an embodiment of the present general inventive concept. First, Hoffman decoding may be performed on the compressed data so as to obtain quantized data. Next, de-quantization may be performed on the quantized data so as to restore DCT components, and IDCT may be performed on the DCT components such that the DCT components are converted into YCbCr data. Sequentially, up-sampling may be performed on the YCbCr data to restore the original data of the compressed image.

After decoding the compressed image, the decoder 110 may output the restored image data CIELAB/YCC to the storage unit 130, and may output color difference signal information on the restored image data to the pure black determining unit 120. The restored image data may be data based on CIELAB standard and/or YCbCr.

The pure black determining unit 120 may receive the information on the restored image data. The information on the restored image data may be color-difference signal information on the restored image data. Here, the color-difference signal information input from the decoder 110 to the pure black determining unit 120 means DC information of a color-difference signal.

The pure black determining unit 120 may use the color-difference signal information received from the decoder 110 to determine whether each of the decoded blocks represents pure black. Here, the decoded block means a block composed of 8-by-8 pixels. This is because DCT is typically performed in 8-by-8 pixels.

The decoded blocks used in the pure black determining unit 120 will now be described referring to FIG. 2. The restored image data may be divided into a plurality of decoded blocks 210 each of which may be composed of 8-by-8 pixels.

The pure black determining unit 120 may use color-difference signal information of the first pixel 212 of each of the plurality of decoded blocks 210 to determine whether the corresponding decoded block represents pure black. As illustrated in FIG. 2, each of the plurality of decoded blocks 210 may be composed of 8-by-8 pixels and the first pixel 212 of each decoded block means the (0,0)-th pixel.

The reason why the pure black determining unit 120 may use the color-difference signal information of the first pixel 212 of each decoded block 210 is that a data value, restored in the (0,0)-th pixel of each decoded block 210, of the color-difference signal of the DCT components may represent information on the average of colors constituting the corresponding decoded block. Therefore, it is not required to separately compute information on the average of colors constituting each decoded block 210.

Generally, when a decoded block 210 represents pure black, DC information of the color-difference signal corresponding to the decoded block 210 represents 0. However, although the decoded block 210 may represent pure black, the DC information may not represent 0 due to a structural or optical characteristic of the decoded block 210. For this reason, it is an aspect of the present general inventive concept to set an allowable error range for the DC information of the color-difference signal corresponding to a pure black decoded block 210. The allowable error range may be set to a range from −5 to +5 or a range from −10 to +10.

When the DC information corresponding to a decoded block of the color-difference signal is within a predetermined allowable error range, the pure black determining unit 120 may determine that the corresponding decoded block is pure black. For example, when the predetermined allowable error range is a range from about −10 to +10, and the DC information corresponding to a decoded block 210 of the color-difference signal ranges from about −10 to +10, the pure black determining unit 120 may determine that the corresponding decoded block 210 is pure black.

If the pure black determining unit 120 determines that a decoded block 210 is pure black, it may set bit information regarding the corresponding decoded block 210 to a first value, for example, "1." On the other hand, if the pure black determining unit 120 determines that a decoded block 210 is not pure black, it may set bit information regarding the corresponding decoded block 210 to a second value, for example, "0." In brief, the pure black determining unit 120 may determine whether each decoded block 210 is pure black, and may set bit information regarding the corresponding decoded block 210 to the first or second value 1 or 0. Then, the pure black determining unit 120 may use the bit information so as to generate a pure black determination map 200 of which an example is illustrated in FIG. 2.

The storage unit 130 may receive the restored image data from the decoder 110 and may store the restored image data. The storage unit 130 may also store the bit information which has been obtained as a result of the pure black determination by the pure black determining unit 120. Further, the storage unit 130 may supply the restored image data to the color coordinate converter 150 and may supply the bit information to the section classifying unit 140.

The section classifying unit 140 may use the bit information of the pure black determination map 200 so as to classify each of the decoded blocks 210 into a text section or an image section.

When a predetermined number of successive decoded blocks 210 have been determined to be pure black (that is, when the bit information of the decoded blocks has been set to 1), and when the number of successive decoded blocks 210 is equal to or more than a predetermined number, the section classifying unit 140 may classify each of the successive decoded blocks 210 into a text section.

For example, assuming that the predetermined number is 3, the section classifying unit 140 may classify each of three or more successive decoded blocks 210 whose bit information have been set to 1 into a text section and may classify the other decoded blocks 210 whose bit information have been set to 1 into another text section. A text section is illustrated in a rectangular shape as illustrated in FIG. 2. In FIG. 2, reference symbols A and A' each denotes a text section, and a reference symbol B denotes an image section. Then, the section classifying unit 140 may supply a result of the section classification (hereinafter, referred to as section information) to the color coordinate converter 150.

The color coordinate converter 150 may receive the restored image data and the section information from the storage unit 130, respectively, and may perform color coordinate conversion on only each image section.

Color coordinates of the compressed image input to the image forming apparatus 100 may not be usable in the image forming apparatus 100. For this reason, the color coordinate converter 150 may convert the color coordinates of the compressed image into color coordinates of a usable format.

The color coordinate converter 150 may perform color coordinate conversion on only the image section B. In other words, the color coordinate converter 150 may not perform color coordinate conversion on the text section A and A'. This is because text should be displayed in pure black in order to improve readability of the text. If the color coordinate converter 150 performs color coordinate conversion on the text section, the text may be displayed in black mixed with other colors, resulting in poor readability of the text.

While the color coordinate converter 150 may not perform color coordinate conversion on the text section (A and A') of the image data, it may reflect brightness information Y regarding each decoded block 210 to the text section. The color coordinate converter 150 may output CMYK image data as a result of the color coordinate conversion. Since the color coordinate converter may prevent the color coordinate conversion on the text section, it is possible to represent the image section with a mix of color data, while representing the text section with only pure black data. Accordingly, the image section may be displayed in a mix of colors while the text section may be displayed in pure black to enhance readability of the original image.

The binary image generator 160 may convert the CMYK image data into a binary image, and may output the binary image to the printing unit 170.

The printing unit 170 may print the binary image generated by the binary image generator 160.

Figure 3A:
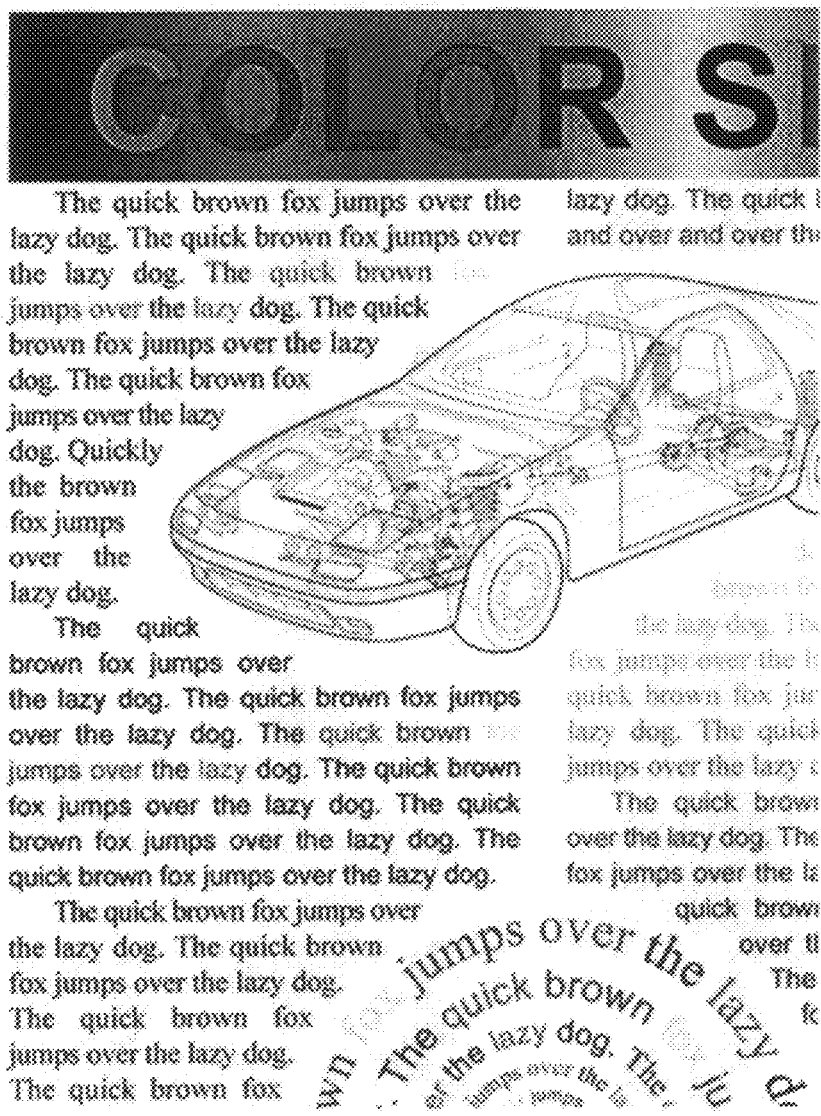
FIGS. 3A to 3C are diagrams illustrating a process of determining pure black in an image forming apparatus according to an exemplary embodiment of the present general inventive concept.
Figure 3B:
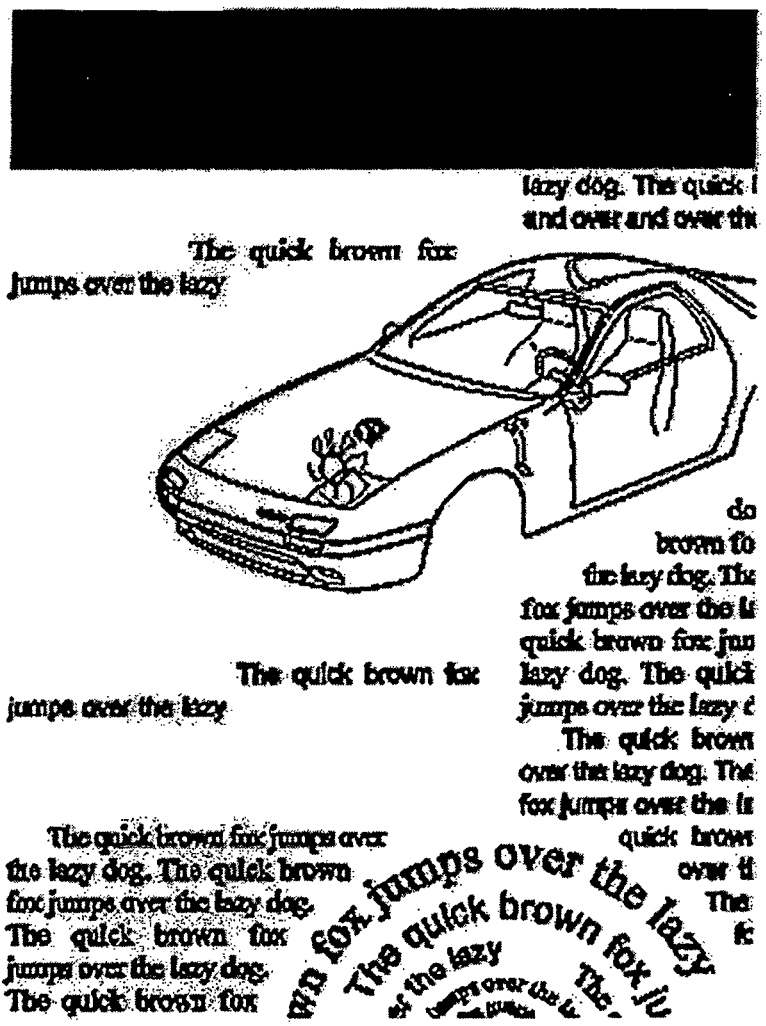
Figure 3C:

FIGS. 3A to 3C are drawings illustrating a pure black determination process in an image forming apparatus according to an exemplary embodiment of the present general inventive concept.

FIG. 3A is a drawing illustrating image data decoded by the decoder 110. Text and images may occur in the image data restored by a decoder 110 and the image data can have various colors. In particular, in the case of text, some portions of the text may be displayed in black and some portions of the text may be displayed in colors other than black.

FIG. 3B is a drawing illustrating a case in which a result of pure black determination of the pure black determining unit 120 is reflected to the image data. In FIG. 3A, there is illustrated a state in which the text portions having colors other than black are displayed in black, and the text portions in black are displayed in white. Here, the portions displayed in white correspond to sections determined to be in pure black.

Although image data is illustrated in FIG. 3A at the same size as the image data illustrated in FIG. 3B, the size of the image data illustrated in FIG. 3A is actually about 1/64 of that of the image data illustrated in FIG. 3B. This is because the pure black determining unit 120 may determine whether each decoded block 210 having an 8-by-8 pixel size is pure black by using the color difference signal information of the first pixel 212 of the corresponding decoded block 210 (FIG. 2). As a result, the amount of information is equal to about 1/64 of that before the pure black determination.

FIG. 3C illustrates a result of section classification of the section classifying unit 140 using the pure black determination result as illustrated in FIG. 3B. A portion, displayed in white, of the sections determined to be pure black by the pure black determining unit 120 corresponds to a text section A, and the remaining portion other than the text section A corresponds to an image section B.

The color coordinate converter 150 may not perform color coordinate conversion on the text section A, but may perform color coordinate conversion on only the image section B. Further, the color coordinate converter 150 may reflect brightness information to the text section A.

Figure 4:
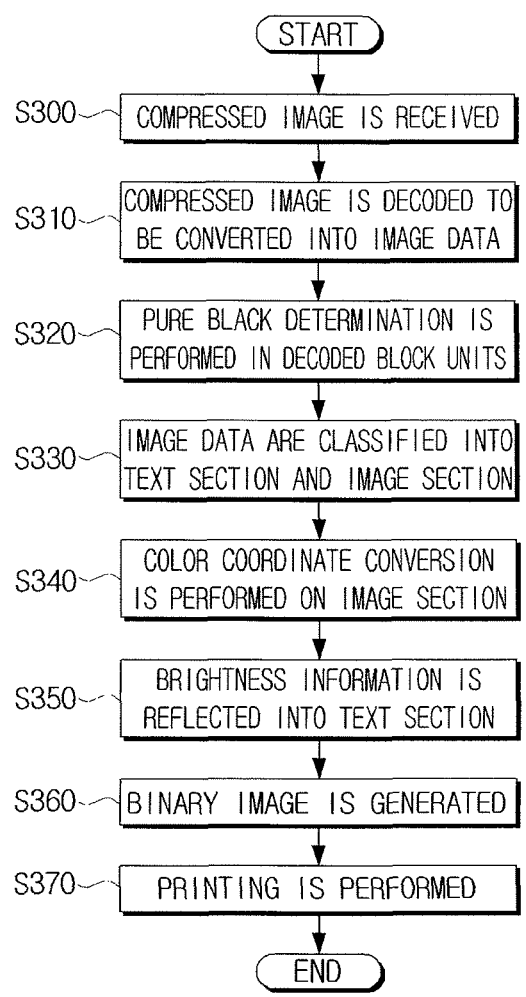
FIG. 4 is a flow chart illustrating an image forming method according to an exemplary embodiment of the present general inventive concept.

FIG. 4 is a flow chart illustrating an image forming method according to an exemplary embodiment of the present general inventive concept.

Referring to FIGS. 1 to 4, a method to display pure black when an image is formed in the image forming apparatus 100 according to an embodiment of the present general inventive concept will now be described.

The image forming apparatus 100 may receive a compressed image from a host apparatus or a flash memory (S300), and the compressed image received by the image forming apparatus 100 may be input to the decoder 110.

The decoder 110 may decode the compressed image through Huffman decoding, de-quantization, IDCT (Inverse Discrete Cosine Transform), and up-sampling to convert the compressed image to image data (S310). The decoder 110 may supply the image data to the storage unit 130 and may supply color difference signal information of the image data to the pure black determining unit 120.

The pure black determining unit 120 may determine whether each decoded block 210 having the 8-by-8 pixel size is pure black by using the color difference signal information (DC information) supplied from the decoder 110 (S320). A pure black determination result of the pure black determining unit 120 may be supplied as bit information to the storage unit 130 and the section classifying unit 140.

The section classifying unit 140 may classify the decoded blocks into the text section A and the image section B by using the bit information corresponding to the pure black determination result supplied from the storage unit 130 or the pure black determining unit 120 (S330).

The color coordinate converter 150 may perform color coordinate conversion on the image section B of the image data by using the image data supplied from the storage unit 130 or the section classifying unit 140 and section information corresponding to a result of the section classification (S340), and may reflect the brightness information to each of decoded blocks 210 corresponding to the text section A (S350).

Next, the binary image generator 160 may convert the CMYK image data into a binary image (S360), and the printing unit 170 may print the binary image (S370).

In this way, color coordinate conversion may not be performed on the text section A, corresponding to the decoded blocks 210 determined to be pure black, of the image data. Therefore, it is possible to inhibit colors other than black from appearing in the text section.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the image forming apparatus and the image forming method thereof according to embodiments of the general inventive concept may classify the decoded blocks of the image data into a text section and a image section based on a pure black determination result, and may perform color coordinate conversion on only the image section. Therefore, it is possible to display the text in pure black and to improve the readability of the text.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
    a decoder to decode a compressed image to convert the compressed image into image data;
    a pure black determining unit to determine whether the image data is pure black by using information of the converted image data;
    a section classifying unit to classify the image data into a text section and an image section by using a result of the pure black determination; and
    a color coordinate converter to perform color coordinate conversion on the image section of the classified sections based on the image data classification without color coordinate converting the text section.

2. The apparatus of claim 1, wherein the information of the converted image data comprises color difference signal information of the image data.

3. The apparatus of claim 1, wherein the pure black determining unit performs pure black determination in decoded block units.

4. The apparatus of claim 3, wherein, when the information of the image data is within a pure black error range, the pure black determining unit determines that the decoded block is pure black.

5. The apparatus of claim 3, wherein the pure black determining unit performs pure black determination by using the information of the image data corresponding to the first pixel of the decoded block.

6. The apparatus of claim 3, wherein, when a predetermined number or more of successive decoded blocks are determined to be pure black by the pure black determining unit, the section classifying unit classifies the predetermined number or more of successive decoded blocks into the text section.

7. The apparatus of claim 1, wherein the color coordinate converter performs the color coordinate conversion on the image section of the classified sections but does not perform the color coordinate conversion on the text section.

8. The apparatus of claim 3, wherein the color coordinate converter reflects brightness information to each of the decoded blocks classified into the text section.

9. The apparatus of claim 1, further comprising:
a binary image generator to convert the image data into a binary image by performing the color coordinate conversion on only the image section; and
a printing unit to print the converted binary image.

10. A method of forming an image, the method comprising:
decoding a compressed image with a decoder to convert the compressed image into image data;
determining whether the image data is pure black by using information of the converted image data;
classifying the image data into a text section and an image section with a section classifying unit by using a result of the pure black determination; and
performing color coordinate conversion only on the image section of the classified sections based on the image data classification by using a color coordinate converter without color coordinate converting the text section.

11. The method of claim 10, wherein the information of the converted image data comprises color difference signal information of the image data.

12. The method of claim 10, wherein the determining of whether the image data is pure black is performed by pure black determination in decoded block units.

13. The method of claim 12, wherein, when the information of the image data is within a pure black error range, the determining of whether the image data is pure black determines that the decoded block is pure black.

14. The method of claim 12, wherein the determining of whether the image data is pure black performs the pure black determination by using the information of the image data corresponding to the first pixel of the decoded block.

15. The method of claim 12, wherein, when a predetermined number or more of successive decoded blocks are determined to be pure black, the classifying of the image data into a text section and an image section classifies the predetermined number or more of successive decoded blocks into the text section.

16. The method of claim 10, wherein the performing of color coordinate conversion performs the color coordinate conversion on the image section of the classified sections but does not perform the color coordinate conversion on the text section.

17. The method of claim 12, wherein the performing of color coordinate conversion reflects brightness information to each of decoded blocks classified into the text section.

18. The method of claim 10, further comprising:
converting the image data into a binary image by performing the color coordinate conversion on only the image section; and
printing the converted binary image.

19. An image forming apparatus, comprising:
a decoder to output image data of a compressed image;
a pure black determining unit to map the image data into a text section and an image section; and
a color coordinate converter to prevent color coordinate conversion on the text section to output pure black data of the text section.

20. The apparatus of claim 19, wherein the pure black determining unit sets bit information corresponding to the text section and the image section to generate a pure black determination map.

21. The apparatus of claim 20, wherein the pure black determining unit sets the bit information corresponding to the text section to a first value, and sets the bit information corresponding to the image section to a second value.

22. The apparatus of claim 19, wherein the color coordinate converter performs the color coordinate conversion on the image section to output color mix data of the image section.

23. The apparatus of claim 22, further comprising:
a printing unit to print an image on a printing medium according to the pure black data of the text section and the color mix data of the image section.

24. The apparatus of claim 19, further comprising:
a printing unit to print an image on a printing medium according to the pure black data of the text section.

* * * * *